United States Patent
Guo et al.

(10) Patent No.: US 10,153,476 B2
(45) Date of Patent: Dec. 11, 2018

(54) ELECTRODE TAB PAD PLATE

(71) Applicant: CONTEMPORARY AMPEREX TECHNOLOGY CO., LIMITED, Ningde (CN)

(72) Inventors: Jian Guo, Ningde (CN); Quankun Li, Ningde (CN); Pinghua Deng, Ningde (CN); Peng Wang, Ningde (CN); Lingbo Zhu, Ningde (CN)

(73) Assignee: Contemporary Amperex Technology Co., Limited, Ningde, Fujian Province (CN)

( * ) Notice: Subject to any disclaimer, the term of this patent is extended or adjusted under 35 U.S.C. 154(b) by 181 days.

(21) Appl. No.: 15/258,686

(22) Filed: Sep. 7, 2016

(65) Prior Publication Data

US 2017/0271644 A1 Sep. 21, 2017

(30) Foreign Application Priority Data

Mar. 18, 2016 (CN) .......................... 2016 1 0157115

(51) Int. Cl.
*H01M 2/26* (2006.01)
*H01M 10/052* (2010.01)
(Continued)

(52) U.S. Cl.
CPC .............. *H01M 2/26* (2013.01); *H01M 2/22* (2013.01); *H01M 2/24* (2013.01); *H01M 2/266* (2013.01);
(Continued)

(58) Field of Classification Search
None
See application file for complete search history.

(56) References Cited

U.S. PATENT DOCUMENTS

| 5,395,710 A * | 3/1995 | Imhof ..................... H01M 2/26 429/161 |
| 9,118,070 B2 * | 8/2015 | Masuda .................. H01M 2/22 |

(Continued)

FOREIGN PATENT DOCUMENTS

| CN | 1934729 A | 3/2007 |
| CN | 101645520 A | 2/2010 |

(Continued)

OTHER PUBLICATIONS

JP-2009252432-A English machine translation (Year: 2009).*
(Continued)

*Primary Examiner* — Scott J. Chmielecki
(74) *Attorney, Agent, or Firm* — Ladas & Parry, LLP

(57) ABSTRACT

The present application relates to an electrode tab pad plate, the electrode tab pad plate is of a fork shape, including a joint part and two first fork feet, the two first fork feet are arranged in parallel, and a first gap is provided between the two first fork feet, both the first fork feet are connected with the joint part. The electrode tab pad plate provided by the present application, through gathering the electrode tabs at inner sides of the electrode tab pad plate, so that the electrode tabs are gathered toward the direction away from the battery housing, so as to guarantee the safety performance of the Li-ion battery, since the space occupied by the electrode tab pad plate is small, which facilitates the improvement of the cell capacity, thereby improving the performance of the battery.

10 Claims, 2 Drawing Sheets

(51) Int. Cl.
*H01M 2/22* (2006.01)
*H01M 2/24* (2006.01)
*H01M 2/28* (2006.01)
*H01M 10/0525* (2010.01)

(52) U.S. Cl.
CPC ......... *H01M 2/28* (2013.01); *H01M 10/0525* (2013.01); *H01M 10/052* (2013.01)

(56) References Cited

U.S. PATENT DOCUMENTS

| | | | | |
|---|---|---|---|---|
| 9,653,714 | B2* | 5/2017 | Mori | H01M 2/12 |
| 9,738,976 | B2* | 8/2017 | Pyzza | H01G 11/10 |
| 2006/0051664 | A1* | 3/2006 | Tasai | H01M 2/266 |
| | | | | 429/161 |
| 2009/0035607 | A1* | 2/2009 | Nedelec | H01M 2/202 |
| | | | | 429/1 |
| 2013/0108903 | A1 | 5/2013 | Martin et al. | |
| 2013/0196218 | A1* | 8/2013 | Masuda | H01M 2/22 |
| | | | | 429/179 |
| 2013/0260221 | A1* | 10/2013 | Yoshitake | H01M 2/024 |
| | | | | 429/179 |
| 2013/0288530 | A1* | 10/2013 | Zhao | H01M 2/206 |
| | | | | 439/627 |
| 2014/0248517 | A1* | 9/2014 | Yoshioka | H01M 2/1077 |
| | | | | 429/90 |
| 2016/0049634 | A1 | 2/2016 | Hwang et al. | |

FOREIGN PATENT DOCUMENTS

| | | |
|---|---|---|
| CN | 102738506 A | 10/2012 |
| CN | 203326008 U | 12/2013 |
| CN | 205543030 U | 8/2016 |
| JP | 2006-059556 A | 3/2006 |
| JP | 2009252432 A * | 10/2009 |
| JP | 2012-059361 A | 3/2012 |
| WO | 2014/054733 | 4/2014 |

OTHER PUBLICATIONS

From EP 16194149.7, European Search Report, dated Feb. 1, 2017.
From JP2016-106235, Notice of Reasons for Refusal, dated May 30, 2017,with an English translation from Google Translate.
From Chinese Application No. 201610157115.0, Office Action dated Sep. 29, 2017 and its English translation from Global Dossier.
From Chinese Application No. 201610157115.0, Office Action dated Mar. 23, 2018 and its machine English translation.

* cited by examiner

ELECTRODE TAB PAD PLATE

CROSS-REFERENCE TO RELATED APPLICATION

This application claims the benefit of and priority to Chinese Patent Application 201610157115.0 filed on Mar. 18, 2016, which is hereby incorporated in its entirety herein by reference.

TECHNICAL FIELD

The present application relates to the field of Li-ion battery technologies and, particularly, relates to an electrode tab pad plate which can keep the electrode tabs to be gathered in a direction away from the battery housing.

BACKGROUND

When a Li-ion battery is being packaged, a bracket is needed to gather electrode tabs inward, and provide space for accommodating the electrode tabs, so as to keep them away from the battery housing and guarantee an insulation state between the electrode tabs and the battery housing for all time, thereby guaranteeing safety performance of the Li-ion battery. However, since the bracket needs a certain space for gathering and accommodating the electrode tabs, which is undesired in improving the battery capacity, and also influences the further improvement of the battery performance.

SUMMARY

The present application provides an electrode tab pad plate, which gathers the electrode tabs at the inner sides of the electrode tab pad plate effectively, so that the electrode tabs are gathered toward the direction away from the battery housing, which facilitates the improvement of the cell capacity.

The present application provides an electrode tab pad plate, the electrode tab pad plate is of a fork shape, including a joint part and two first fork feet, the two fork feet are arranged in parallel, and a first gap is provided between the two first fork feet, both the first fork feet are connected with the joint part.

Preferably, the electrode tab pad plate also includes a handheld part, the handheld part is arranged at a side of the joint part away from the first fork foot.

Preferably, a first guiding surface is provided at an end of the first fork foot away from the joint part, the first guiding surface approaches the first gap gradually in a direction from a side of the first fork foot away from the joint part to a side of the first fork foot close to the joint part.

Preferably, the first guiding surface is a chamfer surface.

Preferably, a second fork foot is included, and the second fork foot is arranged between the two first fork feet, and is arranged in parallel to the two first fork feet, a second gap is provided between the second fork foot and each of the two first fork feet, respectively, the second fork foot is connected with the joint part.

Preferably, a second guiding surface is provided at an end of the second fork foot away from the joint part, the second guiding surface approaches the second gap gradually in a direction from a side of the second fork foot away from the joint part to a side of the second fork foot close to the joint part.

A battery includes a cell and any one of the electrode tab pad plates mentioned above, electrode tabs are arranged at the top of the cell, the electrode tab pad plate is arranged along a direction parallel to a top surface of the cell, so that the electrode tabs of the cell are accommodated in the first gap.

Preferably, the electrode tab pad plate also includes a second fork foot, the second fork foot is arranged between the two first fork feet, and is arranged in parallel to the two first fork feet, a second gap is provided between the second fork foot and each of the two first fork feet, respectively, the second fork foot is connected with the joint part, there are at least two cells which are arranged in parallel, electrode tabs are arranged at top of each cell, multiple electrode tabs are arranged in parallel, the electrode tab pad plate is arranged along a direction parallel to the top surface of the cell, so that the electrode tabs of the cell are all accommodated in the second gap.

Preferably, the electrode tabs located in the first fork foot are formed by being bended in opposite directions, and extending to upside of the first fork foot, and then being bended in relative directions, and extending to upside of the second gap.

Preferably, the distance between two relative sides of the two first fork feet is at least 1 mm larger than distance between the electrode tabs accommodated in the two second gaps.

The technical solution provided by the present application can achieve the following beneficial effect:

The electrode tab pad plate provided by the present application is of a fork shape, though gathering the electrode tabs at inner sides of the electrode tab pad plate, so that the electrode tabs are gathered toward the direction away from the battery housing, so as to guarantee the safety performance of the Li-ion battery, since the space occupied by the electrode tab pad plate is small, which facilitates the improvement of the cell capacity, thereby improving the performance of the battery.

It should be understood that, the above general description and the following detailed description are just exemplary, which should not limit the present application.

Figure 1:
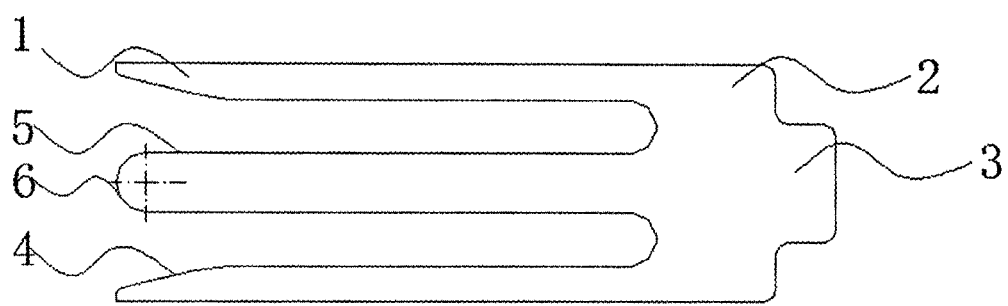
FIG. 1 is a first structural schematic diagram of an electrode tab pad plate according to an embodiment of the present application.
Figure 2:
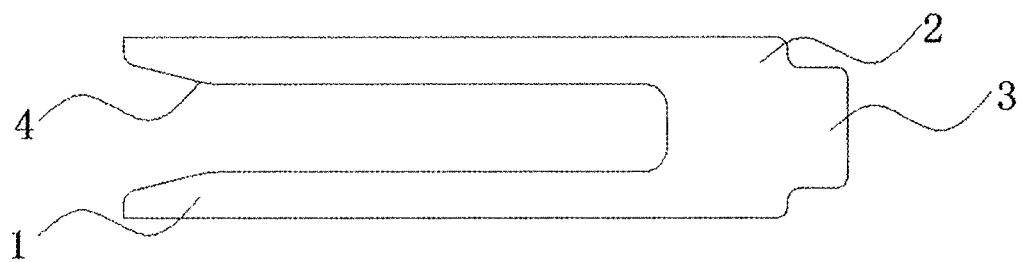
FIG. 2 is a second structural schematic diagram of an electrode tab pad plate according to an embodiment of the present application.

1—first fork foot; 2—joint part; 3—handheld part; 4—first guiding surface; 5—second fork foot; 6—second guiding surface; 7—electrode tab; 8—cell.

The drawings incorporated in the specification form a part of the specification and shows embodiments corresponding to the present application, and are used to explain the principle of the present application together with the specification.

DESCRIPTION OF EMBODIMENTS

The present application will be described in further detail through specific embodiments combining the accompanying drawings. The "front", "back", "left", "right", "up", "down"

in the text are referring to the placement status of the electrode tab pad plate in the drawings.

As shown in FIGS. 1-4, embodiments of the present application provides an electrode tab pad plate, the electrode tab pad plate is of a fork shape, including a joint part 2 and two first fork feet 1. When the Li-ion battery of the prior art is being packaged, a bracket is generally adopted to gather electrode tabs 7 inward, and provide a space for accommodating electrode tabs 7, so that the electrode tabs 7 can keep a certain distance with a battery housing, so as to avoid a short circuit from occurring between the electrode tabs 7 and the battery housing which influences the safety performance of the Li-ion battery. Therefore, a space needs to be provided between the cell 8 and a head cover for accommodating the bracket, the bracket occupies the internal space of the battery housing, which is undesired in improving the capacity of the cell and the battery performance. Based on above reasons, the present application designs an electrode tab pad plate having less space occupancy rate and, at the same time, being capable of keeping the electrode tabs 7 to be distributed away from the housing. During specific application, the electrode tab pad plate needs to be inserted into outer sides of adjacent electrode tabs 7. The present application designs the electrode tab pad plate as a fork shape, the electrode tab pad plate has two first fork feet 1 arranged in parallel, the two first fork feet 1 are connected with each other via the joint part 2 and a first gap is provided between the two first fork feet 1, during specific application, the design of the fork shape structure facilitates the electrode tab pad plate to be inserted at the outer sides of two adjacent electrode tabs 7, of which both being anode or cathode, a first gap is provided in middle for accommodating the electrode tabs 7. In order to further facilitate assembling, a handheld part 3 is also designed for the electrode tab pad plate of the present application, the handheld part 3 is arranged at one end of the joint part 2 and is away from the first fork foot 1.

A first guiding surface 4 is arranged at an end of the first fork foot 1 away from the joint part 2, the first guiding surface 4 is a chamfer surface, which is formed by gradually approaching of a side away from the joint part 2 to a side close to the joint part 2 towards the first gap direction, therefore, since an end with a chamfer surface is formed at one side of the first fork foot 1 away from the joint part 2, when in use, the first guiding surface 4 can guide the insertion of the electrode tab pad plate, so as to facilitate the insertion of the electrode tab pad plate, and prevent the electrode tab from being damaged by the first fork foot while inserting.

In order to achieve better separation of the two adjacent electrode tabs 7, and meanwhile preventing the two adjacent electrode tabs 7 from adhering in the first gap, which may thus occupying space, the present application further provides a second fork foot 5 between the two first fork feet 1, the second fork foot 5 is connected with the joint part 2 in a same manner as the first fork foot 1 and is arranged in parallel to the two first fork feet 1, a second gap is provided between the second fork foot 5 and the two first fork feet 1, so as to accommodate the electrode tabs 7, when the electrode tab pad plate is inserted at outer sides of the adjacent electrode tabs 7, of which both being anode or cathode, the second fork foot 5 is inserted between the two adjacent electrode tabs 7, so as to achieve better separation of the two adjacent electrode tabs 7, and prevent the relative bending parts of the electrode tabs 7 from overlapping with each other, which may thus occupying the accommodation space of the electrode tabs 7. The end surface of the second fork foot 5 away from the joint part 2 is a second guiding surface 6, the second guiding surface 6 is a cambered surface, the distance between the top of the cambered surface and the joint part 2 is larger than the distance between the bottom of the cambered surface and the joint part 2, the cambered surface extends in the direction from the top of the cambered surface close to the joint part 2, and the distance in between with the second gap decreases gradually, the second gap between the second guiding surface 6 and the first fork foot 1 varies from large to small, in order to guide the electrode tabs 7 into the second gap gradually, after the electrode tab 7 enters into the second gap, the second gap becomes smaller, which further facilitates the electrode tab 7 to be gathered in the second gap, and the second fork foot 5 with the cambered surface can prevent the electrode tabs from being damaged when inserting the electrode tab pad plate.

Besides, the first fork foot 1 and the second fork foot 5 close to the handheld part adopt a cambered surface for transition, which strengthens the structural intensity of the electrode tab pad plate, and protects the electrode tabs 7 at the same time.

The width of the handheld part 3 of the present application is smaller than the distance between the two first fork feet 1, structure of which with notches at two ends thereof is adopted, adopting the above structure is to keep away from the heat stake or the buckle on the head cover, the notch can be a curved shape according to actual demands.

Figure 3:
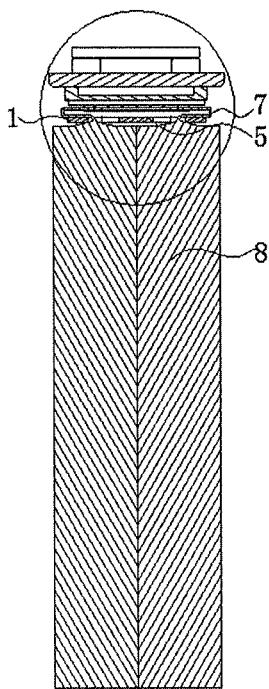
FIG. 3 is a structural schematic diagram of a battery according to an embodiment of the present application.
Figure 4:
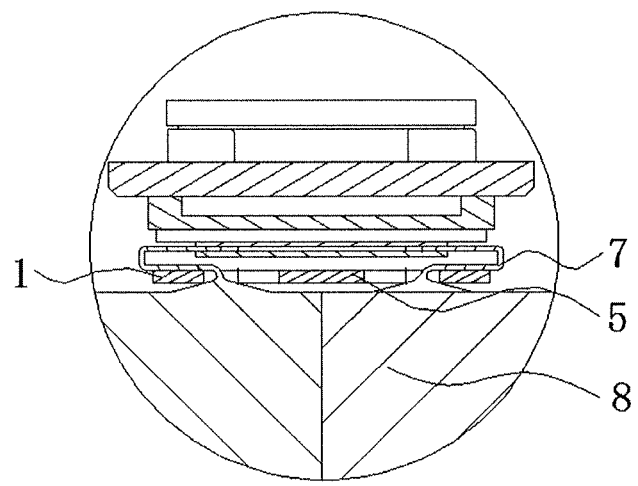
FIG. 4 is a partial enlarged view of FIG. 3.

As shown in FIG. 3 and FIG. 4, the embodiments of the present application further provides a battery, including a housing, a cell 8 and the above electrode tab pad plate, there are two cells 8 which are arranged in parallel in the housing, the electrode tabs 7 are arranged at the top of the cell 8, multiple electrode tabs 7 are distributed in parallel, so that the electrode tabs 7 of the cell 8 are accommodated in the first gap, during the inserting process, the first fork foot 1 is inserted at the outer sides of the electrode tabs 7, that is, the sides of electrode tabs 7 deviated from one another, after the electrode tab pad plate is inserted on the top of the cell 8, the bottom of the electrode tab pad plate contacts the cell 8. First, the two electrode tabs 7 are bended towards directions away from each other and extends to the upside of the first fork foot 1 to contact the upper surface of the first fork foot 1, and are then bended towards directions close to each other, and extends to the upside of the first gap or the second gap, the first gap or second gap provides enough accommodating space for the electrode tabs 7 and keeps the electrode tabs 7 away from the housing, so as to avoid a short circuit with the housing. The distance of the relative sides of the two first fork feet 1 is set as at least 1 mm larger than the distance of the opposite main surfaces of the bottom ends of the two electrode tabs 7, when the head cover is moving close to the cell 8, the electrode tabs 7 will not incline outward under the resistance of the first fork foot 1 and the second fork foot 5 so as to achieve the gathering of the electrode tabs 7, which further facilitates the electrode tab pad plate to be inserted at the outer sides of the two adjacent electrode tabs 7.

In order to insert the electrode tab pad plate in the housing easier, the distance of opposite side surfaces of the two fork feet 1, that is, the width of the electrode tab pad plate, needs to be 1-2 mm smaller than the distance of the housing in the thickness direction of the cell 8.

The electrode tab pad plate provided by the embodiment, through gathering the electrode tabs 7 at inner sides of the electrode tab pad plate, so that the electrode tabs 7 are gathered toward the direction away from the battery housing, so as to guarantee the safety performance of the Li-ion battery, since the space occupied by the electrode tab pad plate is small, which facilitates the improvement of the cell capacity, thereby improving the performance of the battery.

The above described are only preferably embodiments of the present application, which are not intended to limit the present application, for those skilled in the art, the present application can have various modifications and variations. Any modifications, equivalent replacements and improvements made within the spirits and principles of the present application shall all be included in the protection scope of the present application.

What is claimed is:

1. A battery, comprising a cell and an electrode tab pad plate, wherein the electrode tab pad plate is of a fork shape and comprises a joint part and two first fork feet, the two first fork feet are arranged in parallel, and a first gap is provided between the two first fork feet, the two first fork feet are connected with the joint part, wherein electrode tabs are arranged at the top of the cell, the electrode tab pad plate is arranged at a top surface of the cell, so that the electrode tabs of the cell are accommodated in the first gap; and wherein the electrode tabs are firstly bended towards an external side of one of the two first fork feet, and extend to an upside of the one of the two first fork feet, and then extend facing towards the one of the two first fork feet.

2. The battery according to claim 1, wherein the electrode tab pad plate further comprises a second fork foot, the second fork foot is arranged between the two first fork feet, and is arranged in parallel to the two first fork feet, a second gap is provided between the second fork foot and each of the two first fork feet, respectively, the second fork foot is connected with the joint part, there are at least two cells which are arranged in parallel, electrode tabs are arranged at top of each cell of the at least two cells, multiple electrode tabs are arranged in parallel, the electrode tab pad plate is arranged along a direction parallel to the top surface of the cell, so that the electrode tabs of the cell are all accommodated in the second gap.

3. The battery according to claim 2, wherein for each of the at least two cells, the electrode tabs extending facing towards the one of the two first fork feet further extends to upside of the second gap.

4. The battery according to claim 3, wherein distance between two side surfaces of the two first fork feet facing towards each other is at least 1 mm larger than distance between the electrode tabs acommodated in the two second gaps.

5. The battery according to claim 1 further comprises a handheld part, the handheld part is arranged at a side of the joint part away from the two first fork feet.

6. The battery according to claim 1, wherein a first guiding surface is provided at an end of each of the two first fork feet away from the joint part, the first guiding surface approaches the first gap gradually in a direction from a side of each of the two first fork feet away from the joint part to a side of each of the two first fork feet close to the joint part.

7. The battery according to claim 6, wherein the first guiding surface is a chamfer surface.

8. The battery according to claim 1 further comprises a second fork foot, the second fork foot is arranged between the two first fork feet, and is arranged in parallel to the two first fork feet, a second gap is provided between the second fork foot and each of the two first fork feet, respectively, the second fork foot is connected with the joint part.

9. The battery according to claim 8, wherein a second guiding surface is provided at an end of the second fork foot away from the joint part, the second guiding surface approaches the second gap gradually in a direction from a side of the second fork foot away from the joint part to a side of the second fork foot close to the joint part.

10. The battery according to claim 1, wherein the electrode tab pad plate is arranged along a direction parallel to the top surface of the cell.

* * * * *